J. W. HYATT.
Coating Articles with Celluloid, &c.

No. 202,441. Patented April 16, 1878.

Witnesses:
Chas. Q. Gill
B. N. Morris

Inventor:
John W. Hyatt
By his attys
Cox and Cox

UNITED STATES PATENT OFFICE.

JOHN W. HYATT, OF NEWARK, NEW JERSEY, ASSIGNOR TO THE CELLULOID MANUFACTURING COMPANY, OF NEW YORK.

IMPROVEMENT IN COATING ARTICLES WITH CELLULOID, &c.

Specification forming part of Letters Patent No. 202,441, dated April 16, 1878; application filed March 25, 1878.

*To all whom it may concern:*

Be it known that I, JOHN W. HYATT, of Newark, in the county of Essex and State of New Jersey, have invented a new and useful Improvement in Processes for Coating Articles with Celluloid and other plastic compositions, of which the following is a specification, reference being had to the accompanying drawings.

The invention relates to an improved process for coating articles with celluloid and other compositions, and has for its object the production of a seamless homogeneous coating of the said material upon a core or filling.

Celluloid, when warmed, is plastic and easily molded, but after being molded is liable to shrink. This peculiarity is incident to many compositions, in making which a volatile element is employed.

Prior to the invention herein described and claimed the usual process was to form two sections or disks, of suitable dimensions, of the plastic composition, between which the core to be coated was placed, the composition being then closed upon the core, and the whole subjected to great pressure; or one section of composition has been placed in a suitably-formed die, the core being deposited on this section, a second section being laid over the core, and the whole then subjected to pressure.

The product of these processes has, however, always proven unsatisfactory, as there was always a seam about the core whereat the plastic composition was not homogeneously united, and hence, when thoroughly dried, the covering was apt to crack off or open on the line of the seam. As a means of curing this tendency it was sought to unite the edges of the sections by the use of adhesive matter; but this proved a failure in many instances.

To remedy the above defect in the production of composition-coated articles is the object of this invention.

Figure 1:
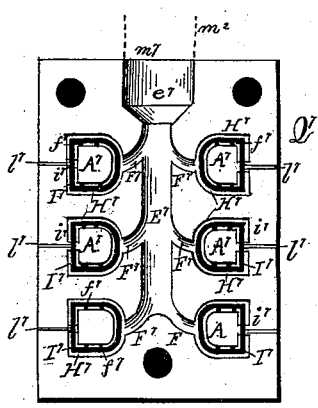
Figure 2:
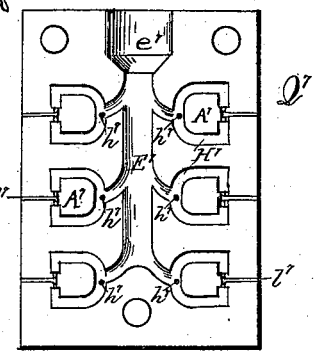
Figure 3:
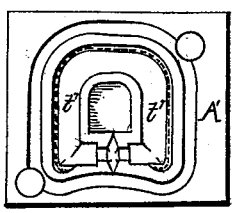
Figure 4:
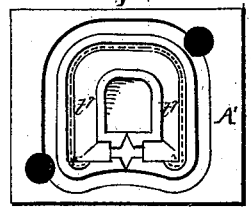
Figure 5:
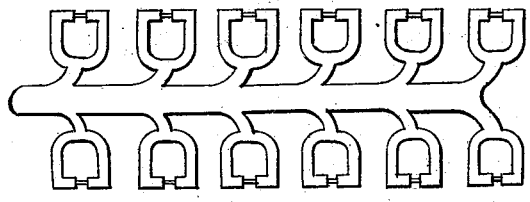
Figure 6:
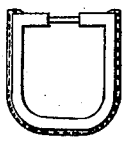

Figures 1 and 2 are plan views of the opposite faces $Q^7$. Figs. 3 and 4 are like views of similar parts of the finishing-die $A^1$. Fig. 5 is a plan view of the cores covered with and connected by the plastic composition as they leave the die $Q^7$, and Fig. 6 is a plan view of the covered core as it appears when removed from the die.

The devices employed for the purpose of amalgamating the elements of the composition and forcing them from the stuffing-box or cylinder to the die, as well as for retaining the die to be filled in place, are, in all material respects, the same as those shown and described in Letters Patent of the United States No. 133,229, granted November 19, 1872, to J. Smith Hyatt and John W. Hyatt, for improvement in process and apparatus for manufacturing pyroxyline.

The above is pertinent to celluloid; but when rubber or other plastic compositions are to be manipulated, the stuffing-box, instead of being constructed as described in said patent, may be made with a smooth surface, the core-block being omitted, and the plungers having a stroke to, or very nearly to, the bottom of the cylinder or stuffing-box.

No claim is asserted herein to any of the devices described or shown in said patent.

In the accompanying drawings, $m^2$ represents a duct or pipe leading to the base of the stuffing-box, substantially as described in said patent, which pipe leads into a die, $Q^7$, which, in the operation, is secured in a hydraulic clamp, which, together with the means of operating it and the piston that expels the composition from the stuffing-box and into the duct $m^7$, are all substantially as specified in said patent, to which reference is made.

The die $Q^7$ is provided at one end with coincident concavities, which, when united, form the aperture $e^7$, to receive the end of the duct $m^7$, through which the composition in a plastic state is brought under pressure from the stuffing-box.

From the aperture $e^7$ a tubular cavity, $E^7$, of less diameter, leads toward the other end of the die, traversing the central parts of the same, and composed of two coincident concavities, formed in the opposite parts of the die. From this cavity $E^7$ a number of gates, $F^7$, lead to the forming-cavities $H^7$, which are of suitable dimensions to receive the core $I^7$, about which the composition is to be molded, the forming-cavity being of such size as to afford a space upon all sides of the core of slightly greater dimensions than the desired formation of composition to be molded on the core.

To enable the composition to pass around upon all sides of the core, studs $f^7$ are set in the cavity, which sustain the core above the surface thereof, while pins $h^7$ are provided adjacent to the boss $A^7$, at the center of the cavity, to prevent the lateral movement of the core, which, by these studs and pins, is thus suspended in the cavity, with a circumjacent space for the reception of the composition. It is plain that these studs and pins may readily be modified in many ways to adapt their functions to cores of other forms than here presented. Thus the studs $f^7$ may be made concave, and the core held between such studs provided in the upper and lower parts of the die, and thus the pins $h^7$ dispensed with; or the pins $h^7$ may be provided with a step or extension to sustain the core, and thus the studs $f^7$ dispensed with.

In the present instance one part of the core is supported by the elevation $i^7$; but this is simply to cut off the composition at this point, leaving the core clear, so that the tongue of a buckle can be placed directly upon it.

In the case of a ring, or other analogous structures, only the studs and pins would be required to sustain the core.

The forming-cavity is provided with an air-vent, $l^7$, placed opposite the gate $F^7$.

The die, in the present instance, is made in two sections, one-half of each cavity being placed coincidently in the opposite section, the sections being connected by the guides $m^7$, and apertures which also serve to give the sections proper movement and relation. The sections of the die should be held in place by a pressure equal to that which causes the exudation of the composition from the duct. This is effected by the hydraulic clamp specified fully in said patent, or by any other suitable means.

The operation of covering the core with composition, which is termed "stuffing the core," is effected simply by placing the core in position in the forming-cavity, filling the stuffing-box, and operating the lever, which communicates movement by hydraulic pressure to the piston of the stuffing-box, and also operates the clamp. Thus the composition is forced into the forming-cavity, the sections of the die being held in place pending the influx of the material.

The result of the operation is a core covered with composition, from the edges of which extends a fin, while the composition is broken at the points where the pins and studs have been in contact with the core, which may be made of solid or tubular metal, or of fibrous or other suitable material.

Preferably the die is kept warm during the above operation.

The core, stuffed as above, is taken from the cavity and placed in a warm die, $A^1$, having a configuration, $t^7$, to which it is desired to form the composition. This configuration is somewhat smaller than the forming-cavity $H^7$, in order to densify the coating.

The sections of the die $A^1$ are closed by a great pressure, which solidifies the composition about the core, the heat softening the composition and the pressure spreading it, so that the breaks therein are filled out and the core covered with a smooth homogeneous coating.

If vulcanizable material is used, the die is not warmed, but with the coated core in it is heated in any suitable manner to vulcanize its contents.

If any excrescence remains upon the edges of the core it can be readily removed and the edges polished or smoothed, as desired.

It is plain that the die may be provided with any desired number of forming-cavities, and, further, that any mechanism that will clamp the die and force the composition into the same, either by one or distinct operations, may be effectively employed.

I do not claim any element or combination of elements mentioned in said patent; but What I do claim, and desire to secure by Letters Patent, is—

1. The within-described process for stuffing frames or cores, which consists in forcing a plastic composition about a core suspended in a cavity, substantially as specified.

2. As a new article of manufacture, a buckle-frame, ring, or analogous structure coated with a homogeneous seamless coating, substantially as specified.

3. A die provided with a channel through which the plastic material may flow and gates through which it may be distributed into forming-cavities, substantially as shown and described.

4. A die having a forming-cavity wherein an open or hollow core or frame is sustained from impact with the surfaces of the cavity, substantially as specified.

5. A forming-cavity, $H^7$, provided with the studs $f^7$, substantially as specified.

6. A forming-cavity, $H^7$, provided with the pins $h^7$, substantially as set forth.

7. The within-described process of coating a core with plastic composition, which consists, first, in stuffing the core with a homogeneous seamless covering, and then pressing it in a warm die to remove the marks left in the coating by the devices which sustained the core while it was being stuffed, substantially as specified.

In testimony that I claim the foregoing improvement in processes for coating articles with celluloid, as above described, I have hereunto set my hand this 5th day of March, 1878.

JOHN W. HYATT.

Witnesses:
SAMUEL S. TIFFANY,
WILLIAM R. SANDS.